United States Patent Office 3,432,397
Patented Mar. 11, 1969

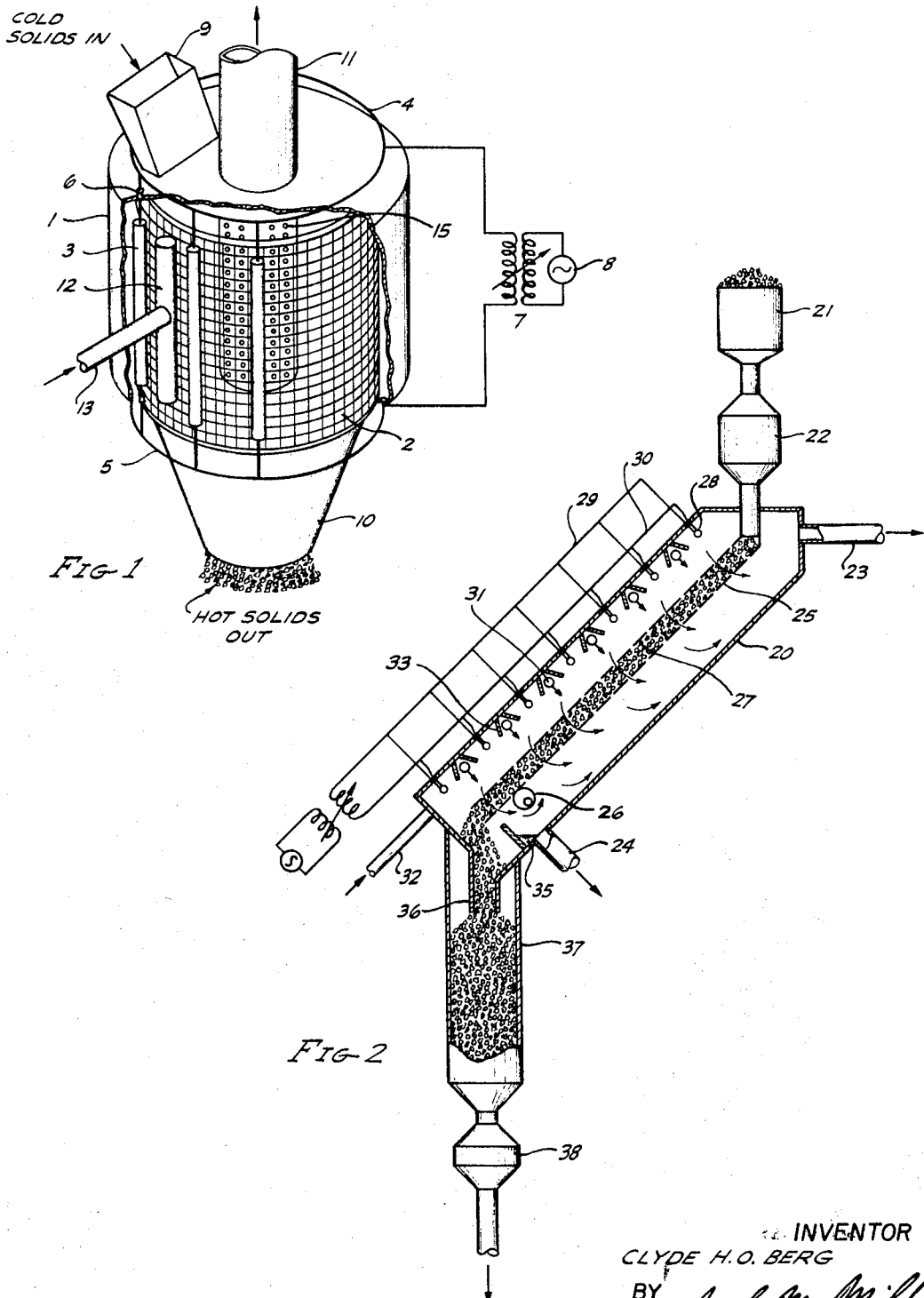

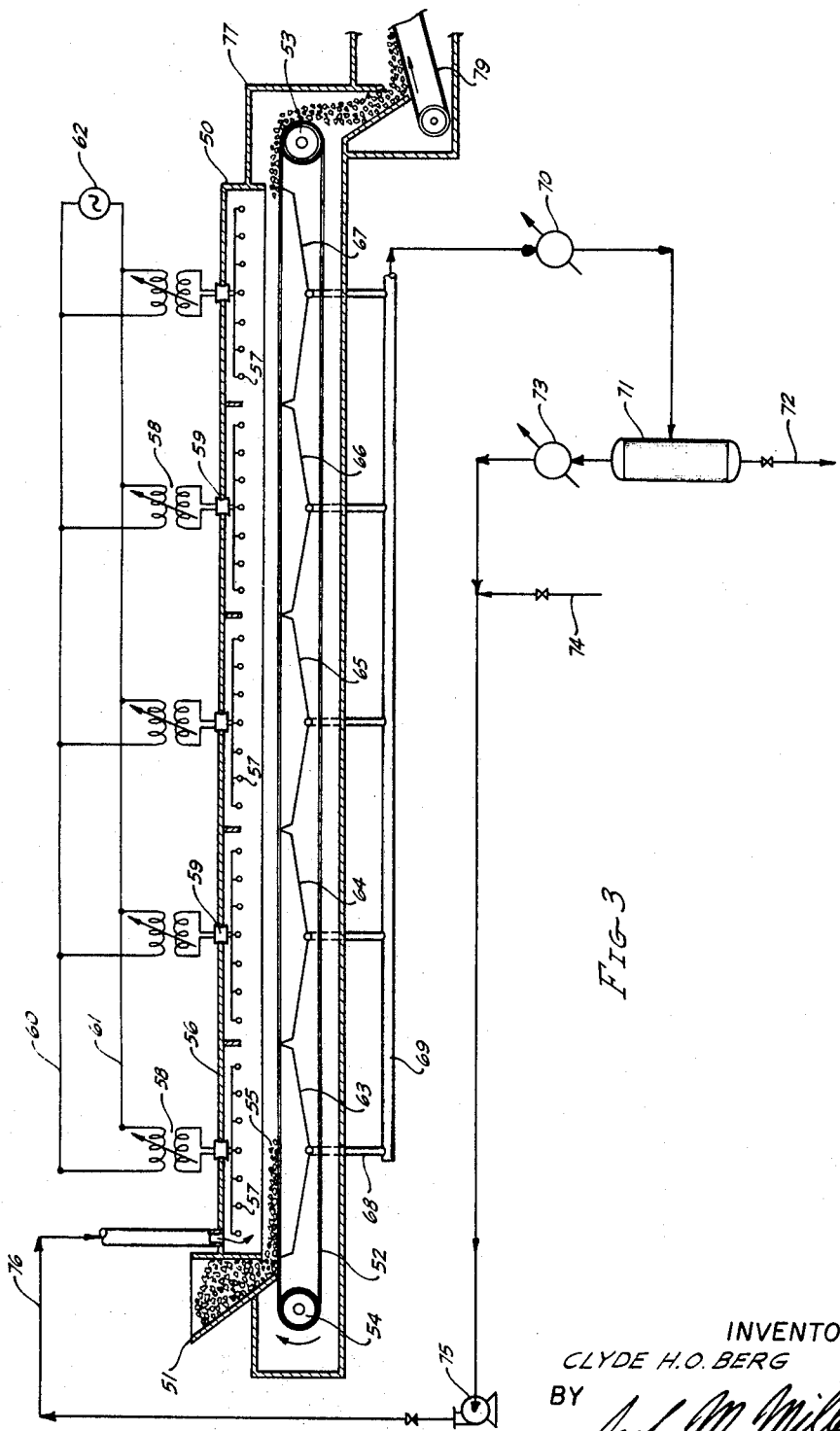

3,432,397
METHOD OF RETORTING SOLIDS
Clyde H. O. Berg, 5 Euclid Ave.,
Long Beach, Calif. 90803
Filed Feb. 23, 1965, Ser. No. 434,498
U.S. Cl. 201—32                              13 Claims
Int. Cl. C10b 49/06, 49/02

ABSTRACT OF THE DISCLOSURE

A method for heating a mass of solid particles arranged into a compact, gas-permeable bed where radiant heat is directed onto one surface of the bed of solid particles comprising directing a flow of a relatively low temperature gas stream onto the heated surface of the bed of solid particles and withdrawing a resulting gas stream from one or more surfaces of the bed that are shielded from the radiant heat.

---

This invention relates to a method for heating a mass of solid particles and, in particular, concerns a method for the radiant heating of carbonaceous solids to produce a carbon residue and distillation products therefrom.

Heretofore, various techniques of radiant heating have been employed to heat various solids in processes such as calcination of coke, calcination of limestone to produce cement, and the destructive distillation of carbonaceous solids such as coal, oil shale and the like to recover the volatile values therefrom. In all these techniques, the solids have been heated by exposing the solids to a high temperature heat source for absorption of radiant heat therefrom and various methods have been employed to move the solids as a contiguous mass through the zone of radiant heat incidence such as gravitating compact beds, vibratory grates, endless belt conveyors, etc. Inclined rotary kilns have been used quite extensively to effect transfer of the solids through the radiant heat zone and to agitate the solids within the radiant heat zone to thereby effect a uniform heat transfer to the individual solid particles.

The aforementioned techniques, particularly the rotary kiln and the vibratory grates, can effect a fairly uniform heating of the solid particles conveyed through the zone of radiant heat incidence when a high degree of agitation is imparted to the bed. These techniques, however, employ relatively complex mechanical equipment and generally do not permit the facile recovery of volatilzed products from the heating operation. In particular, these techniques do not readily permit separate recovery of the products volatilized from the solid at intermediate points of its travel through the zone of radiant heat incidence. Their major disadvantage, however, is their mechanical complexity and higher maintenance requirements than processes employing a compact or substantially quiescent bed of solids.

It is an object of this invention to prescribe a method for the radiant heating of a moving mass of solid particles.

It is also an object of this invention to effect radiant heating of a moving mass of solid particles that are in a substantially quiescent state as a compact, gas-permeable bed.

It is an additional object of this invention to provide a method for substantially increasing the apparent thermal conductivity of a mass of solid particles to thereby increase their radiant heat absorptivity.

It is a further object of this invention to apply such a method for the radiant heating of solids to the destructive distillation of carbonaceous solids.

It is a further object of this invention to prescribe a method for the radiant heating of coal to effect the destructive distillation thereof.

Other and related objects will be apparent from the following disclosure of the invention.

I have now found that the thermal conductivity of a substantially quiescent mass of solid particles can be greatly increased by directing a flow of a relatively low temperature gas onto the heated surface of the solids bed and inducing the gas stream to flow through the compact bed by withdrawing a resulting gas stream from one or more surfaces of the solids bed that are shielded from the radiant heat source. The resultant increase in apparent thermal conductivity of the solids bed results in a marked increase in radiant heat absorption. This result is quite startling and contrary to all practices heretofore employed which have utilized a heated gas stream to effect convection heating of the solids and thereby supplement the radiant heating of the solids. Contrary to these techniques, my invention directs the flow of a relatively low temperature gas, i.e., a gas having a temperature less than the temperature of the hot surface of the solids bed exposed to the radiant heating, onto this surface of the solids. I have found that with the aforementioned low temperature gas flow, the apparent thermal conductivity of the solids bed can be increased from two to five fold or more than that obtained with no gas flow. The effect of various variables on my heating method such as thickness of the solids bed, particle size of the solids, temperature of the gas stream, and rate of gas flow will be described in greater detail in the following paragraphs.

My invention thus briefly comprises a method for heating a mass of solid particles that comprises forming the solid particles into a compact gas-permeable bed, moving the bed of solids through a zone of radiant heat incidence as a substantially quiescent bed while precluding any substantial degree of solid-solid mixing in said bed, directing a source of radiant heat onto one surface of the bed of solids, directing a flow of a relatively low temperature gas stream onto the one surface of the solids in the radiant heat zone, and withdrawing a resulting gas stream from a surface of the solids that is shielded from the radiant heat zone, thereby drawing the low temperature gas stream through the bed of solids to augment the radiant heat transfer.

My invention will now be described in greater detail in reference to the figures of which:

FIGURE 1 illustrates my invention as applied to a gravitating compact bed technique of conveying solids through a radiant heat zone;

FIGURE 2 illustrates my invention as applied to a vibratory grate technique for transferring solids through a radiant heating zone;

FIGURE 3 illustrates my invention as applied to the use of a moving conveyor belt to transfer the solids through the radiant heating zone.

Figure 4:
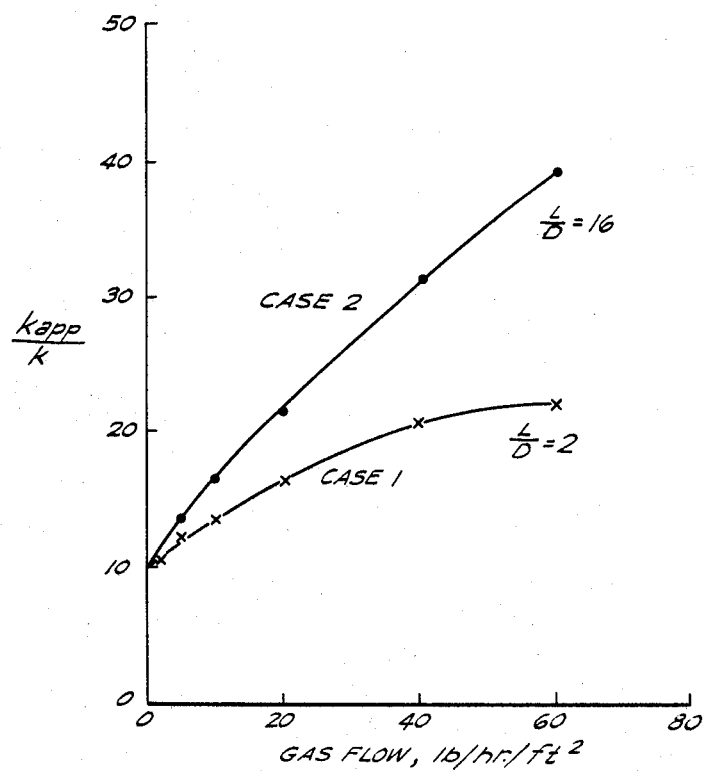
FIGURE 4 graphically illustrates the effect of gas flow on the apparent thermal conductivity of a quiescent bed of solid particles.

Referring now to FIGURE 1, there is illustrated a reaction vessel having an outer shell 1 provided with an internal foraminous lining 2 having a substantially lesser diameter to form an annular space between the foraminous lining 2 and the outer shell 1. Peripherally disposed within this annular space are radiant heating elements 3 such as calrods or other suitable radiant heating means. Although electrical heating is illustrated in this embodiment, it is of course apparent that heating elements 3 could be replaced with tubular means defining paths for hot combustion gases or other heat transfer media. The heating elements 3 are connected by leads passing through insulators 6 in the top and bottom surfaces of the outer shell 1. The leads connect to the electrical bus bars 4 and 5 which are connected to the output of a variable transformer 7. A suitable supply of electrical current is supplied by generator 8.

One or more solids feeding means such as a chute 9 are provided to supply solids to the inside of the foraminous liner 2 and the heated solids are removed through the frustoconical bottom of the vessel 10. Extending longitudinally within the center of the foraminous liner 2 is conduit 11 which has a plurality of foramina 15 along its length within liner 2. Means are provided for removing gaseous and liquid products via conduit 11 which is illustrated as extending the entire length of the radiant heating zone.

A plurality of low temperature gas distributors 12 are provided about the annular space between foraminous liner 2 and outer shell 1. Preferably, these gas distributors 12 are located between the aforementioned heating elements 3 and cold gas supply conduits 13 are provided to supply a low temperature gas to distributors 12. The distributors 12 are provided with a longitudinal row of orifices to distribute gas along their length and to direct a flow of gas radially inwardly through the annular bed of solids in vessel 1.

By the means thus described, cold solids can be introduced in a controlled amount through chute 9 and heated solids removed through the tapered bottom 10 of the vessel. During their travel through the radiant heating zone, the solids are heated by the radiation from heating elements 3. The heat transfer to the solids is greatly increased in accordance with my invention by the supply of the low temperature gas through gas distributors 12 and a resulting gas of about the same or slightly higher temperature is removed via conduit 11 for discharge or treating and recycling. In general, any suitable inert gas can be employed as the low temperature gas, e.g., carbon dioxide, nitrogen, low boiling hydrocarbons, e.g., methane, ethane, propane, etc. Air of course, can be employed when noncombustible solids such as limestone are heated.

Referring now to FIGURE 2 there is depicted a technique for the radiant heating of solids utilizing my invention with a vibratory grate method for transferring solids. In this technique, a radiant heating vessel 20 is provided with a solids feeding means comprising solids hopper 21 and, if desired, pressure lock 22 when vessel 20 is maintained under super-atmospheric pressures. Conduit 23 is provided to withdraw vapor from the vessel 20 and conduit 24 is provided to withdraw liquid products, if any, produced by the heating of the solids. The solids are discharged onto a grate 25 which is vibrated or oscillated with a suitable means such as the mechanically driven cam rocker 26. To prevent extensive solid-solid intermixing in the grate, and to maintain the solids as a layer having relatively uniform depth, a protective screen or foraminous cover 27 is provided on the grate.

Disposed along the roof of radiant heating chamber 20 are a plurality of radiant heating elements 28 which can be the aforementioned calrod electrical heating rods. Again, it is apparent that other heating means can be employed such as gas and oil burners or tubes conveying hot products of combustion. The calrod heating elements are connected to electrical bus bars 29 and 30 by suitable leads which pass through insulating blocks in the roof of the heating chamber 20.

Also disposed along the roof of heating chamber 20 are a plurality of low temperature gas distributors 31 which, preferably, are positioned between the aforementioned heating elements. These gas distributors 31 have a plurality of orifices along their lower surface to discharge a low temperature gas onto the surface of the solids exposed to the radiant heat. A low temperature gas supply conduit 32 is provided as a common header for the gas distributors 31. Preferably, thermal shielding 33 is provided between the low temperature gas distributors and the radiant heating elements to prevent the heating of the gas in these conduits.

The cold gas introduced through gas distributors 31 passes transversely through the layer of solids in the radiant heating zone and the flow of this gas is shown by the arrowhead lines in the FIGURE 2. This gas is collected and removed by conduit 23 for discharge or for treating to separate condensable and condensed products, if any, and for recycling as the cool gas introduced through line 32. Any liquid products that may be produced, e.g., when processing carbonaceous solids, will collect at the base of chamber 20 as shown at 35 and can be removed via conduit 24. The heated solids are discharged from the vibrating grate through duct 36 into hopper 37 for removal via pressure lock 38.

Referring now to FIGURE 3, my invention is illustrated applied to an endless belt conveyor means for the movement of the solids through the radiant heating zones. The heating system comprises heating chamber 50 that has solids feed hopper 51 for the supply of solids to endless belt 52. The belt is moved through the heating zone by drive wheels 53 and 54. This belt is formed of a foraminous material through which gases and liquids can pass, such as a wire screen or chain.

Any suitable radiant heating means can be employed to effect radiant heating of the solids distributed as layer 55 on endless conveyor belt 52. Oil or gas burners can be employed adjacent the roof 56 of heating chamber 50 or, as illustrated, electrical heating elements 57 can be utilized for this purpose. In a preferred construction, the heating chamber is divided into a plurality of sections each of which have a bank of individually controlled radiant heating elements 57. The control means are illustrated as variable transformers such as 58 which are connected to leads passing through insulator blocks 59 in the roof of heating chamber 50 to individual heating elements 57. The input to variable transformers 58 is connected across bus bars 60 and 61 which are supplied with a suitable electrical current from a source such as generator 62.

Disposed beneath foraminous conveyor belt 52 are collecting vessels 63, 64, 65, 66, and 67 which divide the area beneath the belt into five substantially equal sections. These vessels are provided with liquid and vapor withdrawal means such as 68 which conduct the vapor and liquid products to a common header 69 for removal from the system. The products are removed from line 69 through cooler 70. Condensable products when formed are condensed and separated in one or more separating vessels such as 71. The liquid products are withdrawn through conduit 72 and the vapors can be recycled as the supply of the low temperautre gas in accordance with my invention. These vapors can be passed through an additional cooling means when needed such as cooler 73 and makeup gas when needed can be added through line 74. Usually, since the gases leaving separating vessel 71 are substantially the same temperature as the gas introduced to the system via low temperature gas line 76, cooling fluid is not furnished to cooler 73 and it acts only as a conduit. The treated gases are then passed by blower 75 through low temperature gas line 76 for recycling to heating chamber 50. As illustrated, the gases are introduced adjacent the inlet of the solids to the heating chamber. If desired, the gases can be introduced at a plurality of points along the heating chamber, e.g., at the upstream portions of each of the several heating sections delineated by collecting vessels 63, 64, 65, 66, and 67.

The heated solids are discharged from heating chamber 50 into chamber 77 and onto suitable solids receiving provisions, e.g., conveyor belt 79, for removal from the plant.

As previously mentioned, my invention is based on the discovery that the apparent heat conductivity of a layer of solids in a radiant heating zone can be markedly increased by sweeping a low temperature gas through the layer of solids, i.e., a gas temperature lower than the solids temperature. FIGURE 4 illustrates the effect of the gas rate on the apparent thermal conductivity of a layer of solids that are in radiant heat receiving relationship to radiant heat source. The ordinate of FIGURE 4 is the multiple of thermal heat conductivity which can be achieved by use of a cold low temperature sweep gas in accordance with my invention and comprises the apparent thermal conductivity divided by the actual thermal conductivity of the particular solids being heated. The abscissa of FIGURE 4 is the mass gas flow of a lower temperature gas which is directed onto the surface of solids in the radiant heat chamber. FIGURE 4 was derived based on an inlet gas temperature of 0° Fahrenheit. The use of gas at higher inlet temperatures would decrease the slope of the curves only slightly for temperatures in the range of 0° to about 500° Fahrenheit. Two cases are presented in FIGURE 4 having varied ratios of solid layer thickness L and diameter of particles D. From FIGURE 4, it is apparent that the relative thickness and diameter of the solid particles being heated significantly affects the apparent thermal conductivity achieved in accordance with my invention. The lower curve, Case 1, is plotted for solid thickness layers which are twice the average diameter of the solid particles. Case 2 is plotted for layer thicknesses which are 16 times the average particle diameter. The data are plotted for a range of gas mass flow rates from 0 to 60 pounds per hour per square foot of surface of solids exposed to the radiant heating.

The variables in the heating operations of FIGURES 1, 2 or 3 can be widely varied, depending upon the nature of the solids and of the heating apparatus. The radiant heating elements can be employed at temperatures from about 1200° F. to about 2,500° F. or greater, depending on the choice of radiant heating means. When the electrical heating means such as illustrated are employed, radiant temperatures of about 1,400° F. to about 1,800° F. are employed. When hot combustion gases are passed through tubular radiating conduits in the roof of the heating vessels, higher temperatures in the order of 1,600° F. to about 2,500° F. can be employed. It is of course apparent that much higher temperatures up to flame temperatures can be achieved when the radiant heating means comprise oil or gas burners which can be provided in the roof of the heating chambers of FIGURES 2 and 3.

The size of the solid particles heated in accordance with my invention can also be widely varied depending on the nature of the solid material. In general, solids from about 325 mesh to about 2 inches or more in average diameter can be employed. Generally, the solid particle range for most operations is from about 1/16 to about 5/8 inch average diameter. It is understood, of course, that the aforementioned values relate to average particle diameters and that in commercial operations the solids will be present in a range of sizes. In the destructive distillation of coals or other carbonaceous matters such as oil shale, the maximum particle size is generally from about 1/2 to +1/4 inch and the minimum size encountered is less than 20 but greater than 40 mesh.

The gas employed can be any suitable gas such as air, nitrogen, carbon oxides, etc. as well as hydrocarbon gases, e.g., methane, ethane, propane, butane, etc., and mixtures thereof. Preferably, the gas is inert to the solids and, therefore, in the destructive distillation of carbonaceous solids non-oxiding gases are used such as the carbon oxides, nitrogen or hydro-carbon gases. The gas is introduced into contact with the hot surface of the solid bed, i.e., the surface exposed to the radiant heating elements at a temperature that is less than that of the hot solids. It is believed that in this manner the gas serves to impart a convection heating of the solid bed, thereby increasing the total heat absorptivity of the bed. The temperature of the gas therefore preferably should be at least about 100° F., preferably about 250° F. or more below the temperature of the hot surface of the solid bed. In general, gas temperatures from ambient temperatures to about 750° F. can be used and the lower the gas temperature, the greater is the increase of heat absorptivity that can be effected at a set gas flow rate. The total mass rate of gas flow can be varied from about 5 to 150 pounds per hour per square foot of surface area. Preferably, mass gas rates from about 15 to about 75 pounds per hour per square foot are used.

My heating method can be applied to a variety of chemical engineering processes including the destructive distillation of carbonaceous solids such as coal, oil shale, asphalt, etc. to effect the destructive distillation of volatile matter therefrom and to produce distillation products and a coke residue. This heating method can also be applied to the calcination of various solid materials such as gypsum, limestone, and other calcareous and argillaceous materials. In general, these materials are calcined at temperatures from about 840° F. to about 2,200° F. or higher. In the destructive distillation of carbonaceous solids, temperatures of the solid particles usually range from about 950° to about 1,800° Fahrenheit.

As previously mentioned, the thickness of the solid layer relative to the diameter of the particles has a significant effect on the apparent thermal conductivity achieved by my invention. In general, layer thicknesses from about 1 to about 25 times the particle diameters can be employed; preferably, layer thicknesses from about 5 to about 20 times the average particle diameter are used. Such thicknesses range from about 1 to about 6 inches for the aforementioned solid particle sizes when effecting the destructive distillation of carbonaceous solids.

My invention will now be described by illustration of a preferred mode of operation to effect the destructive distillation of coal.

EXAMPLE

The method was applied to an apparatus similar to that of FIGURE 3 having a wire mesh screen belt which traveled through a radiant heating chamber 30 feet in length in the retort. Coal having an average particle diameter of 1/8 inch was distributed on the belt in a layer approximately 2 inches in depth. The coal was supplied at about 60° F. and passed through 5 heating sections of 6 feet length equally divided along the 30-foot retort. The width of the sections was 4 feet. The solids were supplied at a rate of 3.23 tons per hour and coke was discharged from the end of the heating apparatus at 1,000° Fahrenheit.

A low temperature gas at a temperature of 180° F. was passed into the gas introduction line shown as 76 FIGURE 3 at a rate of 47,500 standard cubic feet per hour. The composition of this gas was as follows.

TABLE 1

| Component: | Volume percent |
|---|---|
| Carbon dioxide | 7.3 |
| Carbon monoxide | 7.3 |
| Illuminating gas | 3.9 |
| Hydrogen | 10.1 |
| Methane | 57.0 |
| Ethane | 11.1 |
| Nitrogen | 2.7 |
| Hydrogen sulfide | 0.6 |

The average temperature of the heating elements, average temperature of the coal surface and heat input effected in each of the five sections is presented in the following table:

TABLE 2

| Section | Calrod temperature, °F. | Coal surface temperature, °F. | Heat input, B.t.u. per hour |
| --- | --- | --- | --- |
| 1 | 978 | 493 | 410,000 |
| 2 | 1,430 | 1,005 | 410,000 |
| 3 | 1,600 | 1,310 | 313,000 |
| 4 | 1,600 | 1,390 | 276,000 |
| 5 | 1,600 | 1,430 | 204,000 |

The heating rate in the first two sections was limited by the maximum input capacity of the heating elements and in the last three sections the heating rate was limited by the maximum permissible temperature of these heating elements, 1,600° Fahrenheit. Thus, in the first two sections the heating elements were operated with openline voltage and in the last three sections the heating rate was reduced by the variable transformer. The total heat input or the sum of the heat input in all the sections was 1,613,000 B.t.u.'s per hour.

To compare the results obtained with the conventional method of radiant heating, i.e., with no low temperature gas recycle, the experiment was repeated without recycling system was employed and coal was supplied at 60° F. and heated to 1,000° F. in its passage through the retort. The maximum feed rate while maintaining a coke temperature of 1,000° F. was 2.39 tons per hour or about 26 percent less than that employed with the low temperature sweep gas. The average temperature of the heating elements, coal surface and average heat input in each of the sections under these conditions is presented in the following table:

TABLE 3

| Section | Calrod temperature, °F. | Coal surface temperature, °F. | Heat input, B.t.u. per hour |
| --- | --- | --- | --- |
| 1 | 1,211 | 725 | 410,000 |
| 2 | 1,600 | 1,310 | 278,600 |
| 3 | 1,600 | 1,430 | 182,500 |
| 4 | 1,600 | 1,470 | 156,000 |
| 5 | 1,600 | 1,510 | 108,000 |

The total heat input in this experiment was 1,134,500 B.t.u.'s per hour which was 478,500 B.t.u.'s per hour less than that effected when using the low temperature gas recycle. Thus, it is apparent that in this example my heating method achieved a 42 percent increase in heat transfer to the solids over the conventional method of radiant heat transfer.

The preceding example is intended solely to illustrate a preferred mode of operation of my invention and it is not intended that my invention be unduly limited thereby. Rather, it is intended that my invention be defined by the steps and their equivalents set forth in the following method claims.

I claim:
1. The method of heating a mass of solid particles that comprises:
   (1) forming said solid particles into a compact, gas-permeable bed;
   (2) moving said bed of solid particles through a zone of radiant heat incidence;
   directing a source of radiant heat onto one surface of said bed of solid particles, the surface of said bed which is opposite said one surface being shielded from said source of radiant heat;
   directing a flow of a relatively low temperature gas onto said one surface of said bed of solid particles; and
   withdrawing a resulting gas stream from said opposite side of said bed of solid particles to thereby draw said relatively low temperature gas stream through said bed of solid particles and augment radiant heat transfer to said mass of solid particles.

2. The method of claim 1 wherein said solid particles are formed into a gas-permeable bed having a ratio of bed thickness to average solid particle diameter between about 1 and about 50.

3. The method of claim 1 wherein said relatively low temperature gas is drawn through said bed of solid particles transversely to the movement of said solid particles through said zone of radiant heat incidence.

4. The method of claim 1 wherein said solid particles are formed into a gas permeable bed by distributing said solid particles onto a grate and a vibratory motion is supplied to said grate to move said solid particles through said zone of radiant heat incidence.

5. The method of claim 1 wherein said solid particles are distributed onto a foraminous conveyor belt.

6. The method of claim 1 wherein said solid particles are passed through said zone of radiant heat incidence as a compact gravitating bed.

7. The method of claim 1 wherein said solid particles comprise carbonaceous matter, said heating comprises the destructive distillation of volatile values from said solid particles, and said resulting gas stream is treated to separate condensable liquids therefrom.

8. The method for the destructive distillation of carbonaceous solids to produce a carbon residue and distillation products therefrom that comprises:
   (1) distributing particles of said solids having an average diameter between 1/16 and about 1/2 inch into a compact, gas-permeable bed having a thickness of between about 1 and about 6 inches;
   (2) moving said bed of solids through a zone of radiant heat incidence as a substantially quiescent bed with minimal solid-solid intermixing within said bed to thereby expose one surface of said bed of solids to radiant heating, the other surfaces of said bed being shielded from said radiant heating.
   (3) directing a source of radiant heat having a temperature from about 1,200° F. to about 2,500° F. onto said one surface of said bed of solids to effect the heating of said bed of solids to a temperature between about 400° F. and about 1,500° F. thereby releasing the volatile values from said carbonaceous solids;
   (4) directing the flow of a gas stream onto said one surface of said solids, said gas stream having a temperature of at least about 100° F. less than the temperature of said one surface of said solids;
   (5) withdrawing a resulting gas stream from said other surfaces of said bed of solids to thereby draw said gas stream through said bed of solids and augment the radiant heat transfer to said solids; and
   (6) collecting and recovering said volatile values.

9. The method of claim 8 wherein said volatile values are withdrawn from said solids with said resulting gas stream and said method also comprises the steps of treating said gas stream to separate liquified components therein from the gas.

10. The method of claim 8 wherein said solids are distributed onto a foraminous conveyor belt and said belt is moved through said zone of radiant heat incidence.

11. A method of increasing the thermal conductivity of a mass of solid particles formed into a compact, gas-permeable bed in which said bed of solid particles are moved through a zone of radiant heat incidence and a source of radiant heat is directed onto one surface of said bed of solid particles, the other surfaces of said bed of solid particles being shielded from said source of radiant heat, comprising the steps of:

(1) directing a flow of a relatively low temperature gas onto said one surface of said bed of solid particles; and (2) withdrawing a resulting gas stream from said other surfaces of said bed of solid particles to thereby draw said low temperature gas stream through said bed of solid particles and augment radiant heat transfer to said mass of solid particles.

12. The method of claim 1 wherein said relatively low temperature gas is drawn through said bed of solid particles transversely to the movement of said solid particles through said zone of radiant heat incidence.

13. The method of claim 11 wherein said relatively low temperature gas has a temperature of at least about 100° F. less than the temperature of said one surface of said bed of solid particles.

References Cited

UNITED STATES PATENTS

| | | | |
|---|---|---|---|
| 1,814,463 | 7/1931 | Trent | 202—117 XR |
| 1,978,945 | 10/1934 | Hereng | 202—117 |
| 2,349,300 | 5/1944 | Olsen | 34—39 |
| 2,575,426 | 11/1951 | Parnell | 34—17 XR |
| 2,621,151 | 12/1952 | Carlsson et al. | 201—32 |
| 3,284,317 | 11/1966 | Jahnig et al. | 201—32 XR |

NORMAN YUDKOFF, *Primary Examiner.*

D. EDWARDS, *Assistant Examiner.*

U.S. Cl. X.R.

34—33, 39; 201—36